US011815413B2

(12) United States Patent
Takeichi et al.

(10) Patent No.: US 11,815,413 B2
(45) Date of Patent: Nov. 14, 2023

(54) INSULATED STRAIN GAUGE THAT REDUCES ERROR-CAUSING MOISTURE INCURSION

(71) Applicant: ISHIDA CO., LTD., Kyoto (JP)

(72) Inventors: Shinji Takeichi, Ritto (JP); Yasuhiko Kanai, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 57 days.

(21) Appl. No.: 17/504,504

(22) Filed: Oct. 19, 2021

(65) Prior Publication Data
US 2022/0170803 A1   Jun. 2, 2022

(30) Foreign Application Priority Data
Nov. 30, 2020   (JP) .................. 2020-198164

(51) Int. Cl.
*G01L 1/22*   (2006.01)
(52) U.S. Cl.
CPC .................. *G01L 1/2287* (2013.01)
(58) Field of Classification Search
None
See application file for complete search history.

(56) References Cited

U.S. PATENT DOCUMENTS 4,104,605 A * 8/1978 Boudreaux ............ G01B 7/18
427/124
7,197,940 B2 * 4/2007 Ziebart ................ G01L 1/2287
73/862.632

FOREIGN PATENT DOCUMENTS

| DE | 2728916 A1 | 1/1979 |
| EP | 1384980 A1 | 1/2004 |
| JP | S60-227140 A | 11/1985 |
| JP | S60227140 | * 11/1985 |
| JP | H3-251704 A | 11/1991 |
| JP | H03251704 | * 11/1991 |
| JP | H8-035808 A | 2/1996 |

OTHER PUBLICATIONS

Search Report from the corresponding European Patent Application No. 21210003.6 dated Apr. 4, 2022.

* cited by examiner

*Primary Examiner* — Brandi N Hopkins
*Assistant Examiner* — Nigel H Plumb
(74) *Attorney, Agent, or Firm* — SHINJYU GLOBAL IP

(57) ABSTRACT

Provided is a strain gauge including a substrate, a resistive body, and a metal sheet. The resistive body includes a sensing portion, a first connection portion, and a second connection portion. The metal sheet covers at least the substrate that is exposed between two connection sites to which wirings to an external circuit are respectively connected and provided respectively in the first connection portion and the second connection portion and the sensing portion.

13 Claims, 7 Drawing Sheets

INSULATED STRAIN GAUGE THAT REDUCES ERROR-CAUSING MOISTURE INCURSION

CROSS-REFERENCE TO RELATED APPLICATIONS

This application claims priority to Japanese Patent Application No. 2020-198164, filed on Nov. 30, 2020. The contents of that application are incorporated by reference herein in their entirety.

TECHNICAL FIELD

The present invention relates to a strain gauge and a method for manufacturing a strain gauge.

BACKGROUND ART

As a strain gauge in the related art, for example, a strain gauge described in Japanese Unexamined Patent Publication No. H8-35808 is known. The strain gauge described in Japanese Unexamined Patent Publication No. H8-35808 includes a measurement grid (resistive body) disposed in a supporting coil, and a cover that is disposed in the measurement grid and includes a first layer formed from an insulating material and a second layer formed from a metallic material. The measurement grid includes a strip (sensing portion) having a wave-like shape and an exchange region (connection portion) provided in an end of the strip.

BRIEF SUMMARY

In the strain gauge, when intrusion of moisture (humidity or the like) into a substrate or emission of the intruded moisture from the substrate occurs, expansion and/or contraction may occur in the substrate. In this case, since the resistive body disposed in the substrate stretches or contracts due to expansion and/or contraction of the substrate, a variation may occur in an output of the strain gauge and reliability of the strain gauge may deteriorate. In the strain gauge in the related art, the cover is disposed to cover the strip to suppress intrusion of moisture into the substrate. However, in the strain gauge in the related art, the strip of the measurement grid is covered with a sheet, but the substrate between the exchange region and the measurement grid is exposed. Therefore, in the strain gauge in the related art, there is a concern that intrusion of moisture into the substrate cannot be sufficiently suppressed.

An object of an aspect of the invention is to provide a strain gauge capable of suppressing deterioration of reliability, and a method for manufacturing a strain gauge.

According to an aspect of the invention, there is provided a strain gauge including: a substrate having insulating properties; a resistive body that is disposed on one main surface of the substrate, has conductivity, and stretches and contracts in accordance with deformation of the substrate; and a metal sheet that covers the one main surface of the substrate and is formed from a metallic material. The resistive body includes a sensing portion formed to extend along a first direction while being folded back, a first connection portion which is connected to one end of the sensing portion, and to which a wiring to an external circuit is connected, and a second connection portion which is connected to the other end of the sensing portion, and to which a wiring to the external circuit is connected. The metal sheet covers at least the substrate exposed between two connection sites, to which the wirings to the external circuit are respectively connected, provided respectively in the first connection portion and the second connection portion, and the sensing portion.

In the strain gauge according to the aspect of the invention, the metal sheet covers at least the substrate exposed between two connection sites, to which the wirings to the external circuit are respectively connected, provided respectively in the first connection portion and the second connection portion, and the sensing portion. Since the metal sheet formed from a metallic material does not allow moisture to permeate, intrusion of moisture into the substrate can be suppressed. Accordingly, in the strain gauge, since in addition to the sensing portion, the substrate exposed between the two connection sites and the sensing portion is also covered by the metal sheet, it is possible to reduce a region where the substrate is exposed at the periphery of the resistive body. According to this, in the strain gauge, it is possible to suppress expansion of the substrate due to intrusion of moisture into the substrate and/or contraction of the substrate due to emission of the intruded moisture. Accordingly, in the strain gauge, it is possible to suppress the resistive body from stretching and contracting due to expansion and/or contraction of the substrate. As a result, in the strain gauge, it is possible to suppress deterioration of reliability.

In an embodiment, the metal sheet may be disposed over the first connection portion and the second connection portion, and the sensing portion, and may cover parts of the first connection portion and the second connection portion beyond the substrate exposed between the two connection sites and the sensing portion when viewed from the sensing portion. In this configuration, it is possible to suppress moisture from intruding from a region between the sensing portion, and the first connection portion and the second connection portion.

In an embodiment, the strain gauge may further include an insulating portion that is disposed between the resistive body and the metal sheet and has insulating properties. The insulating portion may include openings through which the two connection sites are respectively exposed, and the metal sheet may be disposed so as not to overlap the openings. In this configuration, the resistive body and the metal sheet are electrically insulated due to the insulating portion. In addition, two connection site portions to which wirings are respectively connected are not covered with the metal sheet. Accordingly, it is possible to connect the wirings to the connection sites while avoiding short-circuiting between the metal sheet and the wirings.

In an embodiment, the sensing portion, and the two connection sites may be disposed to be spaced apart from each other in the first direction, the connection site of the first connection portion and the connection site of the second connection portion may be provided in parallel in a second direction intersecting the first direction, and an end of the metal sheet on the side of the two connection sites may be located in front of edges of the openings on the sensing portion side when viewed from the sensing portion in the first direction. In this configuration, the wirings which are respectively connected to the connection sites are not covered with the metal sheet. Accordingly, it is possible to reliably avoid short-circuiting between the wirings and the metal sheet. In addition, in this configuration, since the wirings are not covered with the metal sheet, it is possible to avoid the wirings from being constrained by the metal sheet.

In an embodiment, in the first connection portion and the second connection portion, an insulating layer may be formed on an upper side of the wirings at the connection sites, and the metal sheet may cover the sensing portion, the first connection portion, and the second connection portion, and may cover at least a part of the wirings from an upper side of the insulating layer in the first connection portion and the second connection portion. In this configuration, the resistive body and the metal sheet are electrically insulated by the insulating layer. In addition, the metal sheet covers the entire region of the sensing portion of the resistive body, the first connection portion, and the second connection portion. Accordingly, in the strain gauge, the region where the substrate is exposed can be further reduced. Accordingly, in the strain gauge, intrusion of moisture into the substrate can be further suppressed.

In an embodiment, the sensing portion, and the two connection sites may be disposed to be spaced apart from each other in the first direction, the connection site of the first connection portion and the connection site of the second connection portion may be provided in parallel in a second direction intersecting the first direction, and the metal sheet may cover two outer edges of the one main surface of the substrate in the second direction, and an outer edge on a side opposite to a side where the two connection sites are disposed in the first direction. In this configuration, intrusion of moisture into the substrate can be further suppressed.

In an embodiment, the metal sheet may further protrude toward an outer side in comparison to the two outer edges of the one main surface of the substrate in the second direction, and the outer edge on a side opposite to a side where the two connection sites are disposed in the first direction. In this configuration, since the metal sheet further protrudes to an outer side in comparison to the substrate, the one main surface of the substrate can be completed covered. In addition, in the strain gauge, since a side surface (end side surface of the one main surface) of the substrate can be completely covered, it is possible to suppress moisture from intruding from the end side surface of the substrate. As a result, in the strain gauge, intrusion of moisture into the substrate can be further suppressed.

In an embodiment, the first direction and the second direction may be orthogonal to each other, and the metal sheet may protrude from the substrate by a length equal to or greater than approximately the half of a length between an end of the resistive body and the outer edge of the substrate in the first direction and on a side opposite to the side where the two connection sites are disposed, may protrude from the substrate by a length equal to or greater than approximately the half of a length between one end of the resistive body and the outer edge of the substrate on the one end side of the resistive body in the second direction, and may protrude from the substrate by a length equal to or greater than approximately the half of a length between the other end of the resistive body and the outer edge of the substrate on the other end side of the resistive body in the second direction. In this configuration, since side surfaces (end side surfaces of the one main surface) of the substrate can be completely covered, it is possible to suppress moisture from intruding from the end side surfaces of the substrate.

In an embodiment, the first direction and the second direction may be orthogonal to each other, and a distance between the sensing portion and the two connection sites may be greater than distances between the sensing portion and the two outer edges of the substrate in the second direction, and a distance between the sensing portion and the outer edge of the substrate on a side opposite to the side where the two connection sites are disposed in the first direction. In this configuration, since the distance between the sensing portion and the two connection sites is great, an area of the substrate exposed between the two connection sites and the sensing portion may be large. Accordingly, in this configuration, it is particularly effective to cover the substrate exposed between the two connection sites and the sensing portion with the metal sheet.

In an embodiment, the strain gauge may further include a rubber sheet that covers the metal sheet from an upper side. In this configuration, a waterproof effect is improved due to the rubber sheet and the metal sheet can be protected by the rubber sheet.

In an embodiment, the strain gauge may further include a covering portion that is formed from a metallic material, is disposed to be electrically insulated from the resistive body on the one main surface of the substrate, and covers at least a part of the one main surface to suppress intrusion of moisture into the substrate. The covering portion may cover at least a part of the substrate that is not covered with the metal sheet. Since the covering portion formed from the metallic material does not allow moisture to permeate, intrusion of moisture into the substrate can be suppressed. Accordingly, in the strain gauge, the substrate is covered with the covering portion that is disposed directly on the one main surface of the substrate, and thus intrusion of moisture into the substrate can be further suppressed.

In an embodiment, the covering portion may be disposed at least at the periphery of each of the first connection portion and the second connection portion. In this configuration, intrusion of moisture into the substrate at the periphery of the first connection portion and the second connection portion can be further suppressed.

In an embodiment, the strain gauge may further include a rubber sheet that covers the metal sheet and the covering portion from an upper side. In this configuration, the waterproof effect is improved by the rubber sheet, and the metal sheet and the covering portion can be protected by the rubber sheet.

In an embodiment, each of the first connection portion and the second connection portion may extend to an outer edge of the one main surface of the substrate at least in a region where the metal sheet does not cover the substrate when viewed in a second direction intersecting the first direction. In this configuration, since the one main surface of the substrate is covered with the first connection portion and the second connection portion, intrusion of moisture into the substrate can be suppressed by the first connection portion and the second connection portion.

According to another aspect of the invention, there is provided a method for manufacturing a strain gauge. The method includes: a process of forming a resistive body that has conductivity and includes a sensing portion formed to extend along a first direction while being folded back, a first connection portion which is connected to one end of the sensing portion, and to which a wiring to an external circuit is connected, and a second connection portion which is connected to the other end of the sensing portion, and to which a wiring to the external circuit is connected on one main surface of a substrate having insulating properties; and a process of disposing a metal sheet that covers the one main surface of the substrate and is formed from a metallic material. In the process of disposing the metal sheet, the substrate exposed between two connection sites, to which the wirings to the external circuit are respectively connected, provided respectively in the first connection portion and the second connection portion, and the sensing portion is covered with at least the metal sheet.

In the method for manufacturing a strain gauge according to the aspect of the invention, at least the substrate exposed between the two connection sites and the sensing portion is covered with the metal sheet. Since the metal sheet formed from a metallic material does not allow moisture to permeate, intrusion of moisture into the substrate can be suppressed. Accordingly, in the strain gauge, since in addition to the sensing portion, the substrate exposed between the two connection sites and the sensing portion is covered with at least the metal sheet, a region where the substrate is exposed at the periphery of the resistive body can be reduced. Accordingly, in the strain gauge, it is possible to suppress expansion of the substrate due to intrusion of moisture into the substrate and/or contraction of the substrate due to emission of the intruded moisture. Accordingly, in the strain gauge, it is possible to suppress the resistive body from stretching and contracting due to expansion and/or contraction of the substrate. As a result, in the strain gauge, it is possible to suppress deterioration of reliability.

According to the aspect of the invention, it is possible to suppress deterioration of reliability.

DETAILED DESCRIPTION

Figure 1:
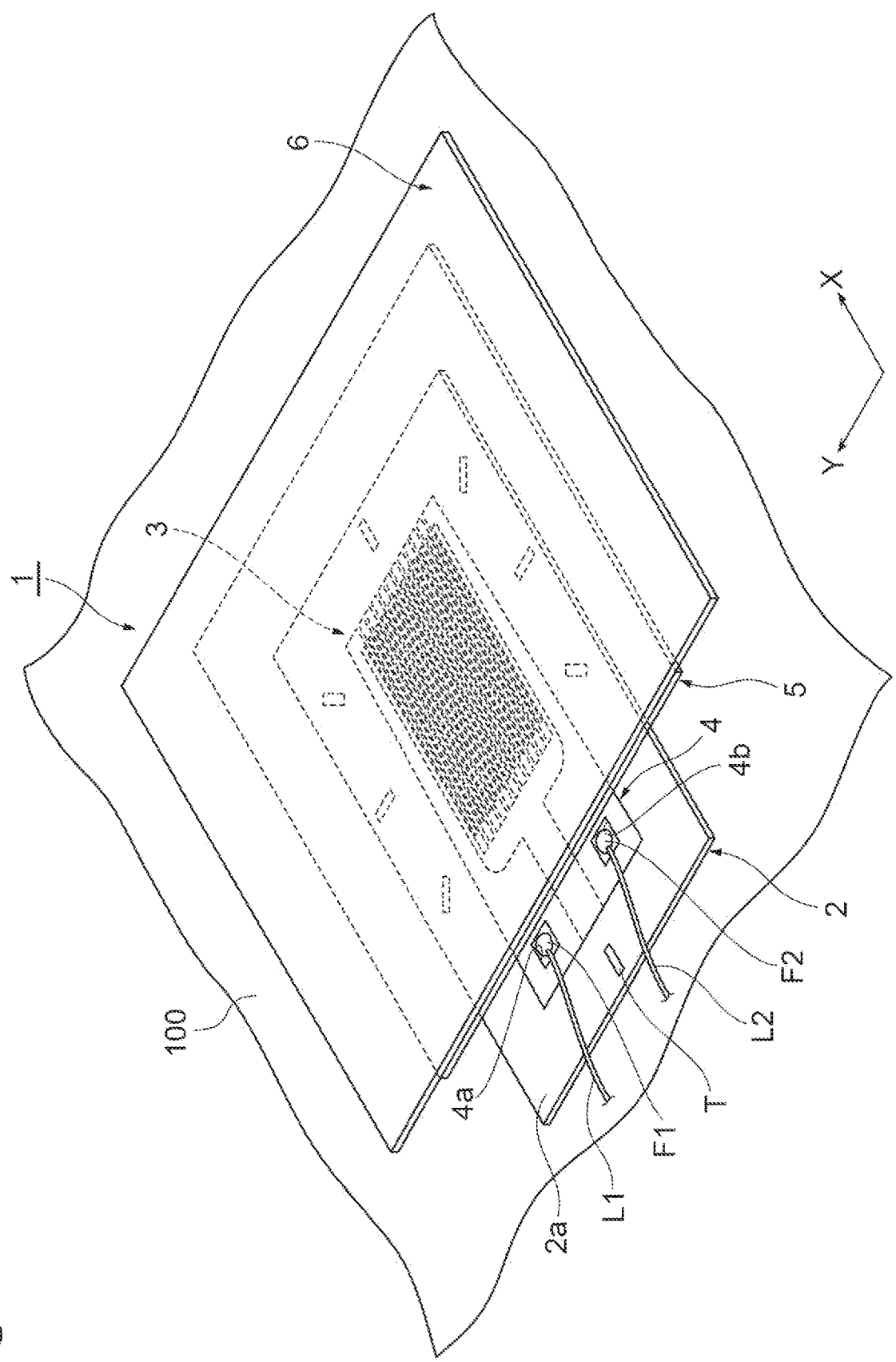
FIG. 1 is a perspective view illustrating a state in which a strain gauge according to an embodiment is provided in a strain inducing body.

Hereinafter, preferred embodiments of the invention will be described in detail with reference to the accompanying drawings. Note that in description of the drawings, the same reference numeral will be given to the same or equivalent element, and redundant description will be omitted. In the following description, "X" in the drawings is set as a first direction, and "Y" in the drawings is set as a second direction. The first direction X and the second direction Y are orthogonal to each other.

As illustrated in FIG. 1, for example, a strain gauge 1 is provided in a strain inducing body 100 of a load cell provided in a measurement device (not illustrated) or the like. A wiring L1 and a wiring L2 are connected to the strain gauge 1. The wiring L1 and the wiring L2 are connected to an external circuit (not illustrated). For example, the external circuit is a bridge circuit. The wiring L1 is connected to a first connection portion 31 (described later) of a resistive body 3 by solder F1. The wiring L2 is connected to a second connection portion 32 (described later) of the resistive body 3 by solder F2.

Figure 2:
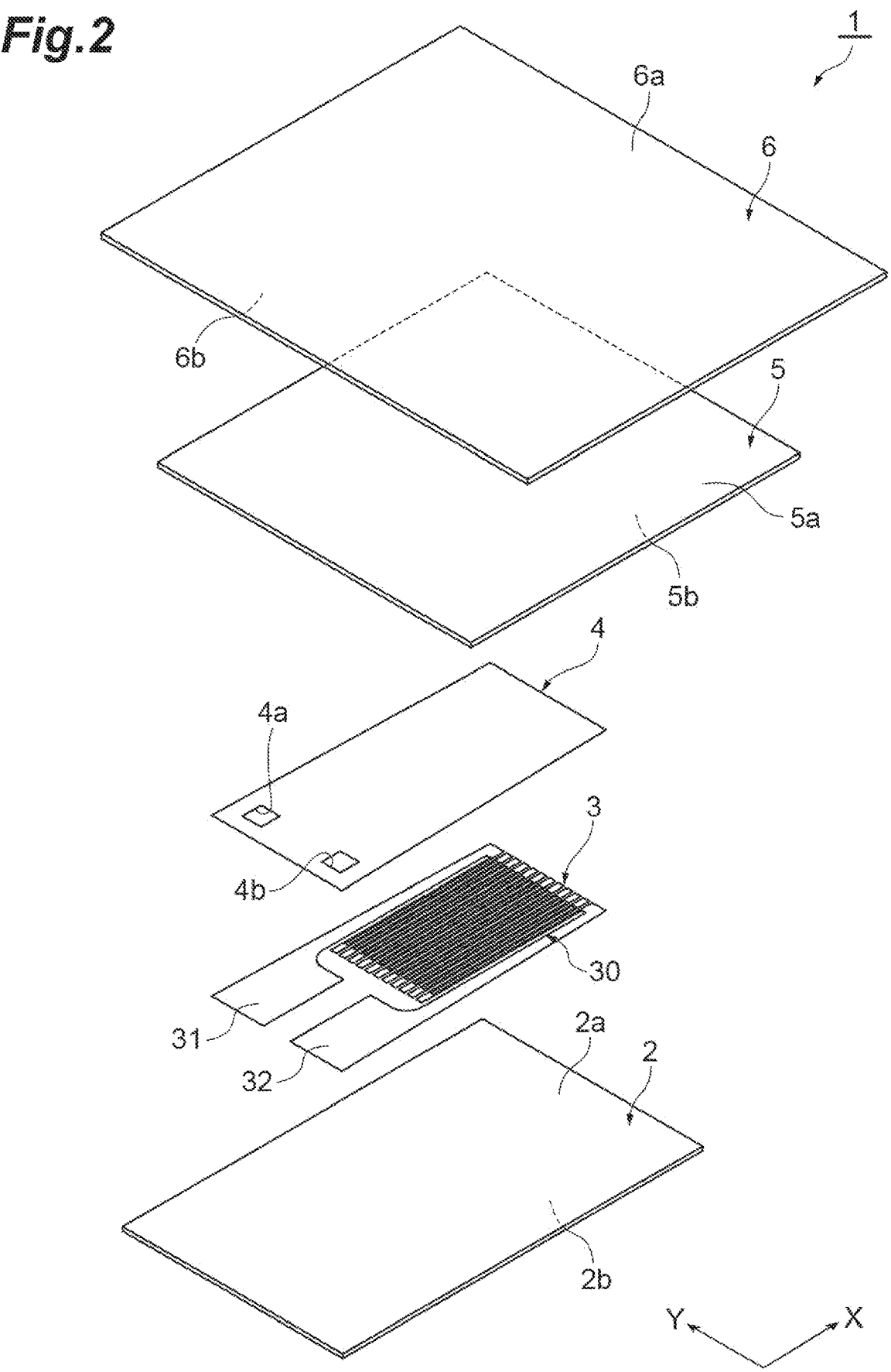
FIG. 2 is an exploded perspective view of the strain gauge illustrated in FIG. 1.
Figure 3:
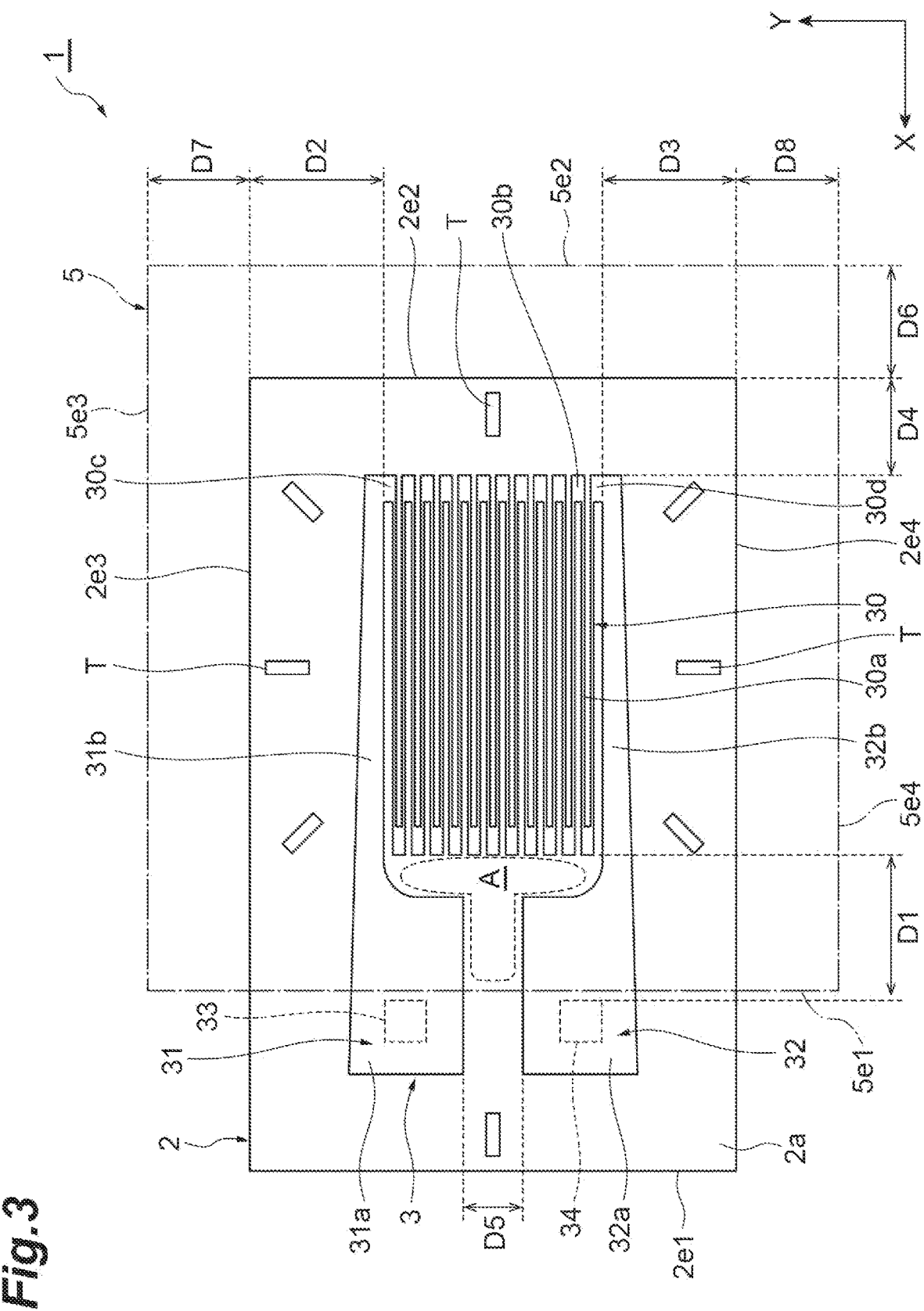
FIG. 3 is a plan view of the strain gauge.

As illustrated in FIG. 2 and FIG. 3, the strain gauge 1 includes a substrate 2, the resistive body 3, an insulating sheet (insulating portion) 4, a metal sheet 5, and a rubber sheet 6. In FIG. 3, illustration of the insulating sheet 4 is omitted.

The substrate 2 supports the resistive body 3. For example, the substrate 2 has a rectangular shape. The substrate 2 has a main surface (one main surface) 2a and a main surface 2b. The substrate 2 has insulation properties. For example, the substrate 2 is formed from a resin. As the resin, for example, polyimide (PI), polyamide imide (PAI), polyethylene (PE), polyether ether ketone, or the like can be used. The substrate 2 has flexibility. For example, the thickness of the substrate 2 is 10 to 50 μm. A plurality of marks T are provided in the substrate 2 at the periphery of the resistive body 3. The marks T are used as a mark (reference) when attaching the substrate 2 to the strain inducing body 100.

The resistive body 3 is disposed on the main surface 2a of the substrate 2. The resistive body 3 is fixed (stuck) to the substrate 2. The resistive body 3 stretches and contracts in accordance with deformation of the substrate 2. A resistance value of the resistive body 3 varies in accordance with stretching and contracting. The resistive body 3 has conductivity. The resistive body 3 is formed from a metallic material. As the metallic material, for example, Cu—Ni or the like can be used. For example, the resistive body 3 can be formed on the main surface 2a of the substrate 2 by a photolithography method. For example, the thickness of the resistive body 3 is 2 to 5 μm.

The resistive body 3 includes a sensing portion 30, a first connection portion 31, and a second connection portion 32. In the resistive body 3, the sensing portion 30, the first connection portion 31, and the second connection portion 32 are integrally formed.

The sensing portion 30 is a portion of which a resistance value varies in accordance with deformation of the substrate. As illustrated in FIG. 3, the sensing portion 30 includes a straight portion 30a and a folded-back portion 30b. The straight portion 30a extends along the first direction X, and a plurality of the straight portions 30a are provided in parallel in the second direction Y that intersects the first direction X. The folded-back portion 30b connects ends of the straight portions 30a adjacent to each other. The sensing portion 30 has an S-shape formed by the plurality of straight portions 30a and a plurality of the folded-back portions 30b.

The first connection portion 31 is connected to one end 30c of the sensing portion 30. A wiring L1 to the external circuit is connected to the first connection portion 31. The first connection portion 31 includes a connection portion 31a and a coupling portion 31b. The connection portion 31a is a portion to which the wiring L1 is connected. For example, the connection portion 31a has an approximately rectangular shape. In this embodiment, each side of the connection portion 31a conforms to the first direction X or the second direction Y. The connection portion 31a includes a connection site 33 to which the wiring L1 is connected (at which solder F1 is formed). The connection site 33 is a partial region of the connection portion 31a.

The coupling portion 31b couples the one end 30c of the sensing portion 30 and the connection portion 31a. The coupling portion 31b extends in the first direction X. In this embodiment, the coupling portion 31b is tapered from the connection portion 31a toward the one end 30c of the sensing portion 30. Note that, the coupling portion 31b may extend between the connection portion 31a and the one end 30c at a constant width.

The second connection portion 32 is connected to the other end 30d of the sensing portion 30. A wiring L2 to the external circuit is connected to the second connection portion 32. The second connection portion 32 includes a connection portion 32a and a coupling portion 32b. The connection portion 32a is a portion to which the wiring L2 is connected. For example, the connection portion 32a has an approximately rectangular shape. In this embodiment, each side of the connection portion 32a conforms to the first direction X or the second direction Y. The connection portion 32a includes a connection site 34 to which the wiring L2 is connected (at which solder F2 is formed). The connection site 34 is a partial region of the connection portion 32a.

The coupling portion 32b couples the other end 30d of the sensing portion 30 and the connection portion 32a. The coupling portion 32b extends in the first direction X. In this embodiment, the coupling portion 32b is tapered from the connection portion 32a toward the other end 30d of the sensing portion 30. Note that, the coupling portion 32b may extend between the connection portion 32a and the other end 30d at a constant width.

The sensing portion 30, and the connection portion 31a (connection site 33) of the first connection portion 31 and the connection portion 32a (connection site 34) of the second connection portion 32 are disposed to be spaced apart with a predetermined interval in the first direction X. The connection portion 31a of the first connection portion 31 and the connection portion 32a of the second connection portion 32 are provided in parallel with a predetermined interval in the second direction Y. In the resistive body 3, a distance D1 between the sensing portion 30 and the two connection sites 33 and 34 is greater than distances D2 and D3 between the sensing portion 30 and two outer edges 2e3 and 2e4 of the substrate 2 in the second direction Y, and a distance D4 between the sensing portion 30 and an outer edge 2e2 of the substrate 2 on a side opposite to a side where the two connection sites 33 and 34 are disposed in the first direction X (D1>D2, D3, and D4). In addition, the distance D1 is greater than a distance D5 between the connection portion 31a of the first connection portion 31 and the connection portion 32a of the second connection portion 32 in the second direction Y.

As illustrated in FIG. 1 and FIG. 2, the insulating sheet 4 is disposed on the resistive body 3. The insulating sheet 4 is located between the resistive body 3 and the metal sheet 5. The insulating sheet 4 has insulating properties. For example, the insulating sheet 4 is formed from a resin. As the resin, polyimide (PI), polyamide imide (PAI), polyethylene (PE), polyether ether ketone, or the like can be used. For example, the thickness of the insulating sheet 4 is 10 to 50 μm. The insulating sheet 4 may be formed by applying a liquid agent for forming the insulating sheet 4 onto the resistive body 3 and by solidifying the liquid agent, or may be formed by bonding the insulating sheet 4 to the resistive body 3. As a method of bonding the insulating sheet 4 to the resistive body 3, epoxy-based adhesive may be used, or a surface of the insulating sheet 4 may be dissolved by a solvent and may be compressed against the resistive body 3. Note that, the insulating sheet 4 may have a shape corresponding to a shape of the resistive body 3.

As illustrated in FIG. 2, the insulating sheet 4 covers the resistive body 3. For example, the insulating sheet 4 has an approximately rectangular shape. The insulating sheet 4 has a size capable of covering the entirety of the resistive body 3. A first opening 4a and a second opening 4b are provided in the insulating sheet 4.

For example, the first opening 4a has a rectangular shape. The first opening 4a is a penetration hole that passes through the insulating sheet 4 in a thickness direction. The first opening 4a is formed in correspondence with the connection site 33 of the first connection portion 31 of the resistive body 3. The connection site 33 is exposed through the first opening 4a in a state in which the insulating sheet 4 covers the resistive body 3.

For example, the second opening 4b has a rectangular shape. The second opening 4b is a penetration hole that passes through the insulating sheet 4 in the thickness direction. The second opening 4b is formed in correspondence with the connection site 34 of the second connection portion 32 of the resistive body 3. The connection site 34 is exposed through the second opening 4b in a state in which the insulating sheet 4 covers the resistive body 3.

The metal sheet 5 covers the main surface 2a of the substrate 2. For example, the metal sheet 5 has a rectangular shape. The metal sheet 5 has a main surface 5a and a main surface 5b. The metal sheet 5 is metal foil formed from a metallic material. As the metallic material, Al, Ni, Cu, Cr, Au, an alloy (for example, Ni—Cr) of the elements, or the like can be used. For example, the thickness of the metal sheet 5 is 2 to 10 μm. The metal sheet 5 is bonded to the substrate 2 by adhesive. As the adhesive, for example, epoxy-based adhesive can be used.

As illustrated in FIG. 2, the metal sheet 5 is disposed in such a manner that the main surface 5b faces the main surface 2a of the substrate 2. As illustrated in FIG. 3, the metal sheet 5 covers at least the substrate 2 that is exposed between the two connection sites 33 and 34, to which the wirings L1 and L2 to the external circuit are respectively connected, provided respectively in the first connection portion 31 and the second connection portion 32 of the resistive body 3, and the sensing portion 30. In this embodiment, the metal sheet 5 covers a region A including a portion where the substrate 2 is exposed between the two connection sites 33 and 34, and the sensing portion 30, and a part of a portion where the substrate 2 is exposed between the two connection sites 33 and 34.

In this embodiment, the metal sheet 5 is disposed over the first connection portion 31, the second connection portion 32, and the sensing portion 30, and covers parts of the connection portion 31a of the first connection portion 31 and the connection portion 32a of the second connection portion 32 beyond the substrate 2 that is exposed between the two connection sites 33 and 34 and the sensing portion 30 when viewed from the sensing portion 30. Specifically, the metal sheet 5 is disposed so as not to overlap a first opening 4a and a second opening 4b of the insulating sheet 4, and an end (outer edge 5e1) of the metal sheet 5 on the side of the two connection sites 33 and 34 is located in front of edges of the first opening 4a and the second opening 4b on the sensing portion 30 side when viewed from the sensing portion 30 in the first direction X.

The metal sheet 5 covers the two outer edges 2e3 and 2e4 of the main surface 2a of the substrate 2 in the second direction Y, and the outer edge 2e2 on a side opposite to a side where the two connection sites 33 and 34 are disposed in the first direction X, and further protrudes toward an outer side with respect to the two outer edges 2e3 and 2e4, and the outer edge 2e2. The metal sheet 5 protrudes from the substrate 2 by a length equal to or greater than approximately the half of a length between an end of the resistive body 3 and the outer edge 2e2 of the substrate 2 in the first direction X and on a side opposite to the side where the two connection sites 33 and 34 are disposed. Specifically, when a distance between the outer edge 2e2 of the substrate 2 and an outer edge 5e2 of the metal sheet 5 is set as D6, the distance D6 is equal to or greater than the half of the distance D4 (D6≥½D4).

The metal sheet 5 protrudes from the substrate 2 by a length equal to or greater than approximately the half of a length between one end of the resistive body 3 and the outer edge 2e3 of the substrate 2 on the one end side of the resistive body 3 in the second direction Y. Specifically, when a distance between the outer edge 2e3 of the substrate 2 and an outer edge 5e3 of the metal sheet 5 is set as D7, the distance D7 is equal to or greater than the half of the distance D2 (D7≥½D2). In addition, the metal sheet 5 protrudes from the substrate 2 by a length equal to or greater than approximately the half of a length between the other end of the resistive body 3 and the outer edge 2e4 of the substrate 2 on the other end side of the resistive body 3 in the second direction Y. Specifically, when a distance between the outer edge 2e4 of the substrate 2 and an outer edge 5e4 of the metal sheet 5 is set as D8, the distance D8 is equal to or greater than the half of the distance D3 (D8≥½D3).

The rubber sheet 6 covers the metal sheet 5 on an upper side. For example, the rubber sheet 6 has a rectangular shape. The rubber sheet 6 has a main surface 6a and a main surface 6b. For example, the rubber sheet 6 is formed from a butyl rubber, or a urethane rubber. For example, the thickness of the rubber sheet 6 is 0.5 to 2.0 mm.

The rubber sheet 6 is larger than the metal sheet 5 (an area of the rubber sheet 6 is greater than an area of the metal sheet 5). The rubber sheet 6 is disposed in such a manner than the main surface 6b faces the main surface 5a of the metal sheet 5. In the rubber sheet 6, an outer edge on a side opposite to a side where the two connection sites 33 and 34 are disposed in the first direction X, and both outer edges in the second direction Y further protrude toward an outer side with respect to the metal sheet 5. The rubber sheet 6 is bonded to the metal sheet 5 by an adhesive force of the rubber sheet 6.

Next, a method (an assembly method) for manufacturing the strain gauge 1 will be described.

First, the resistive body 3 is formed on the main surface 2a of the substrate 2 (a process of forming the resistive body 3). The resistive body 3 is formed on the substrate 2 by a photolithography method. Specifically, a metal layer (a metal film) is formed on the substrate 2, a mask is disposed after forming a photoresist on the metal layer, and a pattern of the resistive body 3 is formed through exposure. Then, an etching treatment and removal of the photoresist are performed to form the resistive body 3 on the substrate 2. In addition, the marks T are also formed on the main surface 2a of the substrate 2 by a photolithography method in combination with the resistive body 3. Note that, a method for forming the resistive body 3 and the marks T is not limited to the photolithography method, and the resistive body 3 and the marks T may be formed by another method (a method of forming only the resistive body 3 and bonding the resistive body 3 to the substrate 2, or the like).

Next, the insulating sheet 4 is formed on the resistive body 3. The insulating sheet 4 is formed as follows. A liquid agent for forming the insulating sheet 4 is applied onto the resistive body 3 in a rectangular shape, and the liquid agent is dried and solidified to form a sheet. Next, a chemical is applied to a portion where the first opening 4a and the second opening 4b are to be formed and is exposed to light to form the first opening 4a and the second opening 4b. A chemical may be applied to a portion other than the first opening 4a and the second opening 4b, and may be exposed to light to form the first opening 4a and the second opening 4b. Then, the chemical is washed to form the insulating sheet 4. Note that, the insulating sheet 4 may be formed by sticking a sheet in which the first opening 4a and the second opening 4b are formed in advance to the resistive body 3. In addition, the first opening 4a and the second opening 4b may be formed after sticking the insulating sheet 4 in which openings are not formed to the resistive body 3.

Next, the metal sheet 5 is disposed to cover the main surface 2a of the substrate 2 (a process of disposing the metal sheet 5). The metal sheet 5 is disposed on the substrate 2 to cover the region A of the substrate 2 that is exposed between the two connection sites 33 and 34 of the first connection portion 31 and the second connection portion 32, and the sensing portion 30. Finally, the rubber sheet 6 is disposed on the metal sheet 5. Note that, the rubber sheet 6 may be provided after the strain gauge 1 is mounted on the strain inducing body 100.

When mounting the strain gauge 1 on the strain inducing body 100, first, the strain inducing body 100 that is a mounting target is washed to remove an oil on a surface of the strain inducing body 100. Next, for example, epoxy-based adhesive is applied to the strain inducing body 100, and the strain gauge 1 is mounted on the strain inducing body 100 on the basis of the marks T. Next, compression is performed by a jig, and heating is performed in an oven for a predetermined time (for example, three hours). Then, the wirings L1 and L2 are respectively connected to the connection sites 33 and 34 by the solder F1 and the solder F2.

As described above, in the strain gauge 1 according to this embodiment, the metal sheet 5 covers at least the substrate 2 that is exposed between the two connection sites 33 and 34, to which the wirings L1 and L2 to the external circuit are respectively connected, provided respectively in the first connection portion 31 and the second connection portion 32, and the sensing portion 30. Since the metal sheet 5 formed from a metallic material does not allow moisture to permeate, intrusion of moisture into the substrate 2 can be suppressed. Accordingly, in the strain gauge 1, in addition to the sensing portion 30, the substrate 2 exposed between the two connection sites 33 and 34, and the sensing portion 30 is also covered by the metal sheet 5, and thus an exposed region of the substrate 2 at the periphery of the resistive body 3 can be reduced. According to this, in the strain gauge 1, it is possible to suppress expansion of the substrate 2 due to intrusion of moisture into the substrate 2 and/or contraction of the substrate 2 due to emission of the intruded moisture. Accordingly, in the strain gauge 1, it is possible to suppress the resistive body 3 from stretching and contracting due to expansion and/or contraction of the substrate 2. As a result, in the strain gauge 1, deterioration of reliability can be suppressed.

In this embodiment, the metal sheet 5 covers the region A including a part of a portion where the substrate 2 is exposed between the two connection sites 33 and 34 in addition to a portion where the substrate 2 is exposed between the two connection sites 33 and 34 and the sensing portion 30. Accordingly, in the strain gauge 1, it is possible to further suppress the resistive body 3 from stretching and contracting due to expansion and/or contraction of the substrate 2.

Note that, the above-described moisture is moisture (humidity) contained in the air in an environment in which the strain gauge 1 is disposed. Accordingly, in the strain gauge 1, it is possible to suppress expansion of the substrate 2 due to intrusion of moisture contained in the air into the substrate 2, and/or contraction of the substrate 2 due to emission of the intruded moisture into the air. Of course, moisture is not limited to the moisture contained in the air.

In the strain gauge 1 according to this embodiment, the metal sheet 5 is disposed over the first connection portion 31 and the second connection portion 32, and the sensing portion 30, and covers parts of the first connection portion 31 and the second connection portion 32 beyond the substrate 2 that is exposed between the two connection sites 33 and 34 and the sensing portion 30 when viewed from the sensing portion 30. In the configuration, it is possible to suppress moisture from intruding through the region between the sensing portion 30 and two pieces of the first connection portion 31 and the second connection portion 32.

The strain gauge 1 according to this embodiment includes the insulating sheet 4 that is disposed between the resistive body 3 and the metal sheet 5 and has insulating properties. The insulating sheet 4 includes the first opening 41a and the second opening 42a through which the two connection sites 33 and 34 are exposed. The metal sheet 5 is disposed so as not to overlap the first opening 41a and the second opening 42a. In this configuration, the resistive body 3 and the metal sheet 5 are electrically insulated from each other due to the insulating sheet 4. In addition, portions of the two connection sites 33 and 34 to which the wirings L1 and L2 are respectively connected are not covered with the metal sheet 5. Accordingly, it is possible to connect the wirings L1 to L2 to the connection sites 33 and 34 while avoiding short-circuiting between the metal sheet 5 and the wirings L1 and L2.

In the strain gauge 1 according to this embodiment, the sensing portion 30 and the two connection sites 33 and 34 are disposed to be spaced apart from each other in the first direction X. The connection site 33 of the first connection portion 31 and the connection site 34 of the second connection portion 32 are provided in parallel in the second direction Y. An end of the metal sheet 5 on the side of the two connection sites 33 and 34 is located in front of edges of the first opening 41a and the second opening 42a on the sensing portion 30 side when viewed from the sensing portion 30 in the first direction X. In this configuration, the wirings L1 and L2 which are connected to the connection sites 33 and 34 are not covered with the metal sheet 5. Accordingly, it is possible to reliably avoid short-circuiting between the wirings L1 and L2 and the metal sheet 5. In addition, in this configuration, since the wirings L1 and L2 are not covered with the metal sheet 5, it is possible to avoid the wirings L1 and L2 from being constrained by the metal sheet 5.

In the strain gauge 1 according to this embodiment, the sensing portion 30, and the two connection sites 33 and 34 are disposed to be spaced apart from each other in the first direction X. The connection site 33 of the first connection portion 31 and the connection site 34 of the second connection portion 32 are provided in parallel in the second direction Y. The metal sheet 5 covers the two outer edges 2e3 and 2e4 of the main surface 2a of the substrate 2 in the second direction Y, and the outer edge 2e2 on a side opposite to a side where the two connection sites 33 and 34 are disposed in the first direction X. In this configuration, it is possible to further suppress moisture from intruding into the substrate 2.

In the strain gauge 1 according to this embodiment, the metal sheet 5 further protrudes toward an outer side with respect to the two outer edges 2e3 and 2e4 of the main surface 2a of the substrate 2 in the second direction Y, and the outer edge 2e2 on a side opposite to a side where the two connection sites 33 and 34 are disposed in the first direction X. In this configuration, since the metal sheet 5 further protrudes toward an outer side in comparison to the substrate 2, the main surface 2a of the substrate 2 can be completely covered. In addition, in the strain gauge 1, since side surfaces (end side surfaces of the main surface 2a) of the substrate 2 can be completely covered, it is possible to suppress moisture from intruding through the end side surfaces of the substrate 2. As a result, in the strain gauge 1, it is possible to further suppress moisture from intruding into the substrate 2.

In the strain gauge 1 according to this embodiment, the metal sheet 5 protrudes from the substrate 2 by a length equal to or greater than approximately the half of a length between an end of the resistive body 3 and the outer edge 2e2 of the substrate 2 in the first direction X and on a side opposite to the side where the two connection sites 33 and 34 are disposed, protrudes from the substrate 2 by a length equal to or greater than approximately the half of a length between one end 30c of the resistive body 3 and the outer edge 2e3 of the substrate 2 on the one end 30c side of the resistive body 3 in the second direction Y, and protrudes from the substrate 2 by a length equal to or greater than approximately the half of a length between the other end 30d of the resistive body 3 and the outer edge 2e4 of the substrate 2 on the other end 30d side of the resistive body 3 in the second direction Y. In this configuration, since the side surfaces (end side surfaces of the main surface 2a) of the substrate 2 can be completely covered, it is possible to suppress moisture from intruding from the end side surfaces of the substrate 2.

In the strain gauge 1 according to this embodiment, the distance D1 between the sensing portion 30 and the two connection sites 33 and 34 is greater than distances D2 and D3 between the sensing portion 30 and the two outer edges 2e3 and 2e4 of the substrate 2 in the second direction Y, and the distance D4 between the sensing portion 30 and the outer edge 2e2 of the substrate 2 on a side opposite to the side where the two connection sites 33 and 34 are disposed in the first direction X. In this configuration, since the distance D1 between the sensing portion 30 and the two connection sites 33 and 34 is large, an area of the substrate 2 exposed between the two connection sites 33 and 34 and the sensing portion 30 may increase. Accordingly, in this configuration, it is particularly effective to cover the substrate 2 exposed between the two connection sites 33 and 34 and the sensing portion 30 with the metal sheet 5.

The strain gauge 1 according to this embodiment further includes the rubber sheet 6 that covers the metal sheet 5 from an upper side and is formed from a butyl rubber. In this configuration, a waterproof effect is improved due to the rubber sheet 6 and the metal sheet 5 can be protected by the rubber sheet 6.

Hereinbefore, an embodiment of the invention has been described, but the invention is not limited to the above-described embodiment, and various modifications can be made within a range not departing from the gist of the invention.

Figure 4:
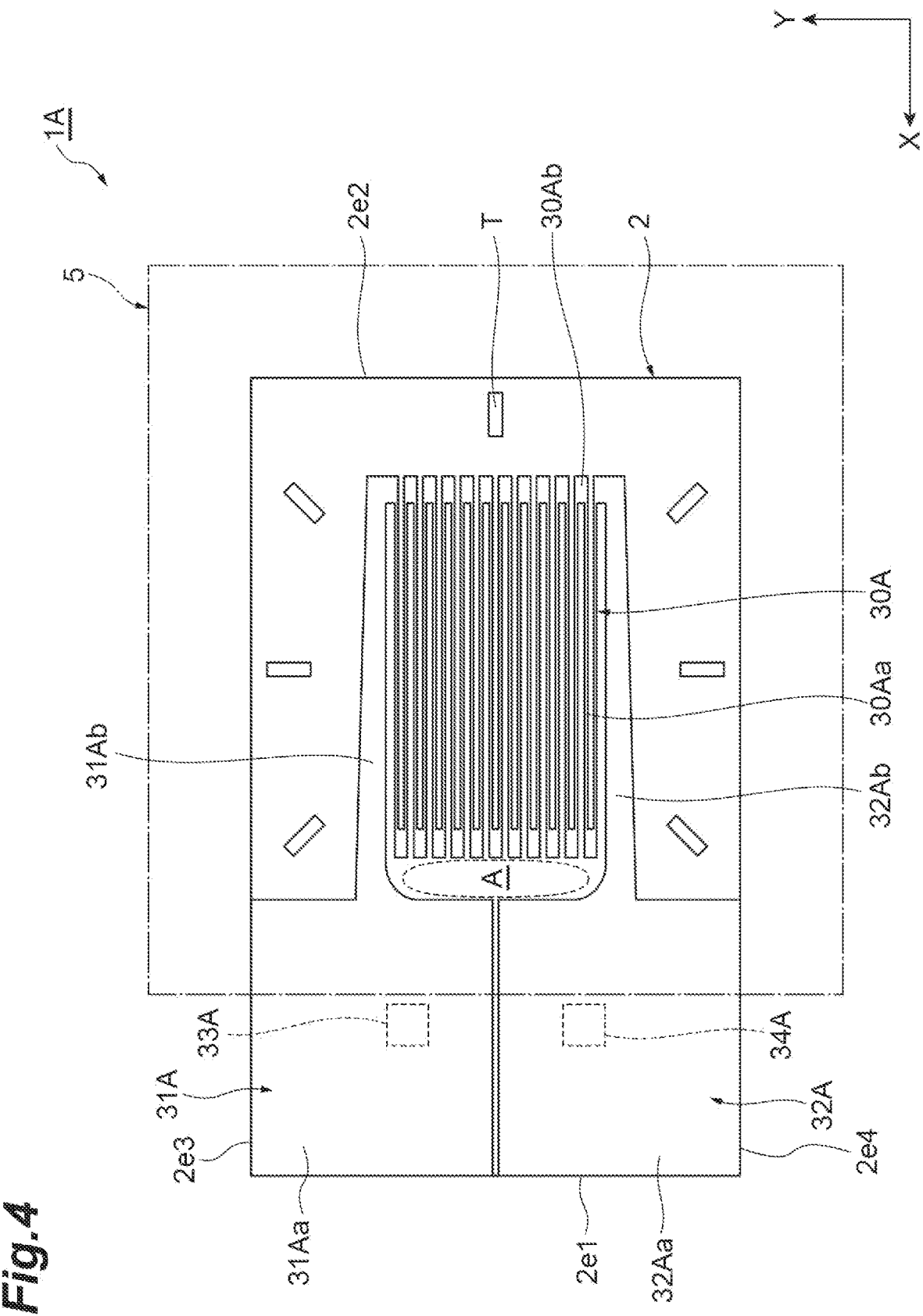
FIG. 4 is a plan view of a strain gauge according to another embodiment.

In the above-described embodiment, description has been given of an aspect in which the first connection portion 31 and the second connection portion 32 are disposed to be spaced apart from the outer edges 2e1, 2e3, and 2e4 of the substrate 2 as an example. However, the configuration of the first connection portion 31 and the second connection portion 32 is not limited to that aspect. As illustrated in FIG. 4, a resistive body 3A of a strain gauge 1A includes a sensing portion 30A, a first connection portion 31A, and a second connection portion 32A. The first connection portion 31A includes a connection portion 31Aa and a coupling portion 31Ab. The second connection portion 32A includes a connection portion 32Aa and a coupling portion 32Ab. A connection site 33A is provided in the first connection portion 31A. A connection site 34A is provided in the second connection portion 32A.

In the strain gauge 1A, the connection portion 31Aa of the first connection portion 31A and the connection portion 32Aa of the second connection portion 32A respectively extend to the outer edges 2e3 and 2e4 of the main surface 2a of the substrate 2 at least in a region where the metal sheet 5 does not cover the substrate 2 when viewed in the second direction Y. In this configuration, since the main surface 2a of the substrate 2 is covered with the first connection portion 31A and the second connection portion 32A, it is possible to suppress intrusion of moisture into the substrate 2 by the first connection portion 31A (connection portion 31Aa) and the second connection portion 32A (connection portion 32Aa).

Figure 5:
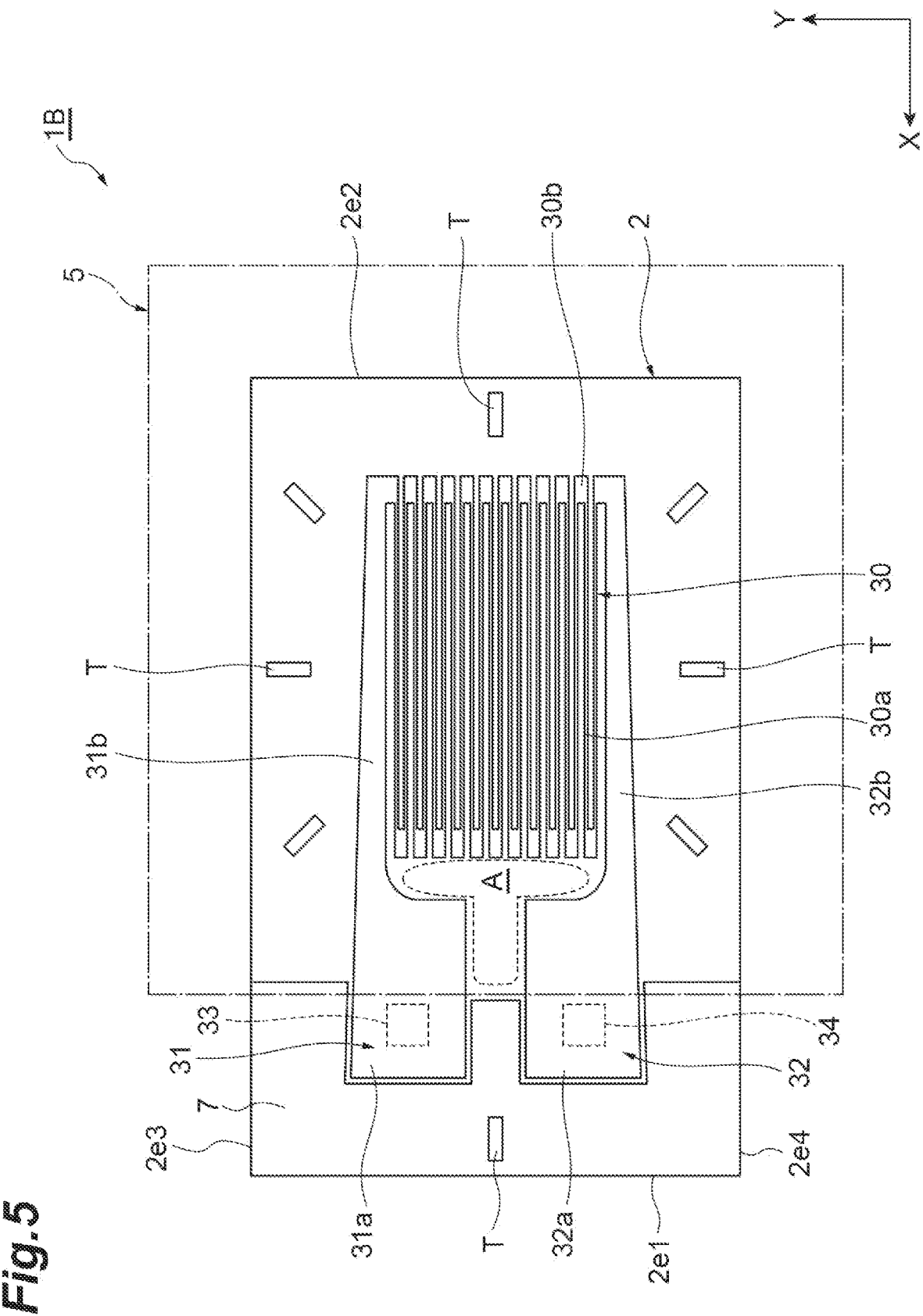
FIG. 5 is a plan view of a strain gauge according to still another embodiment.

In addition to the above-described embodiment, as illustrated in FIG. 5, a strain gauge 1B may further include a covering portion 7. The covering portion 7 is formed from a metallic material and is disposed to be electrically insulated from the resistive body 3 on the main surface 2a of the substrate 2. As the metallic material, for example, Cu—Ni, or the like can be used. For example, the covering portion 7 can be formed on the main surface 2a of the substrate 2 by a photolithography method. The covering portion 7 covers at least a part of the main surface 2a of the substrate 2 and suppresses intrusion of moisture into the substrate 2. The covering portion 7 covers a part of the substrate 2 that is not covered with the metal sheet 5. Specifically, the covering portion 7 is formed at the periphery of the first connection portion 31 and the second connection portion 32 which are not covered with the metal sheet 5 on the substrate 2. Note that, as illustrated in FIG. 5, the metal sheet 5 and the covering portion 7 may partially overlap each other, or may not overlap each other. In other words, when viewed from the sensing portion 30 in the first direction X, the metal sheet 5 may be configured to extend to a location in front of the first connection portion 31 and the second connection portion 32, to cover a region between the sensing portion 30, and the first connection portion 31 and the second connection portion 32, and not to overlap the first connection portion 31 and the second connection portion 32. Even in this case, exposure of the substrate 2 between the sensing portion 30, the first connection portion 31, and the second connection portion 32 is reduced. However, from the viewpoint of moisture resistance, it is preferable that the metal sheet 5 and the covering portion 7 overlap each other. The reason for this is because the metal sheet 5 can completely cover the substrate 2 located between the sensing portion 30, and the first connection portion 31 and the second connection portion 32.

Since the covering portion 7 formed from a metallic material does not allow moisture to permeate, intrusion of moisture into the substrate 2 can be suppressed. Accordingly, in the strain gauge 1B, the substrate 2 is covered with the covering portion 7 that is disposed directly on the main surface 2a of the substrate 2, and thus intrusion of moisture into the substrate 2 can be further suppressed.

Figure 6:
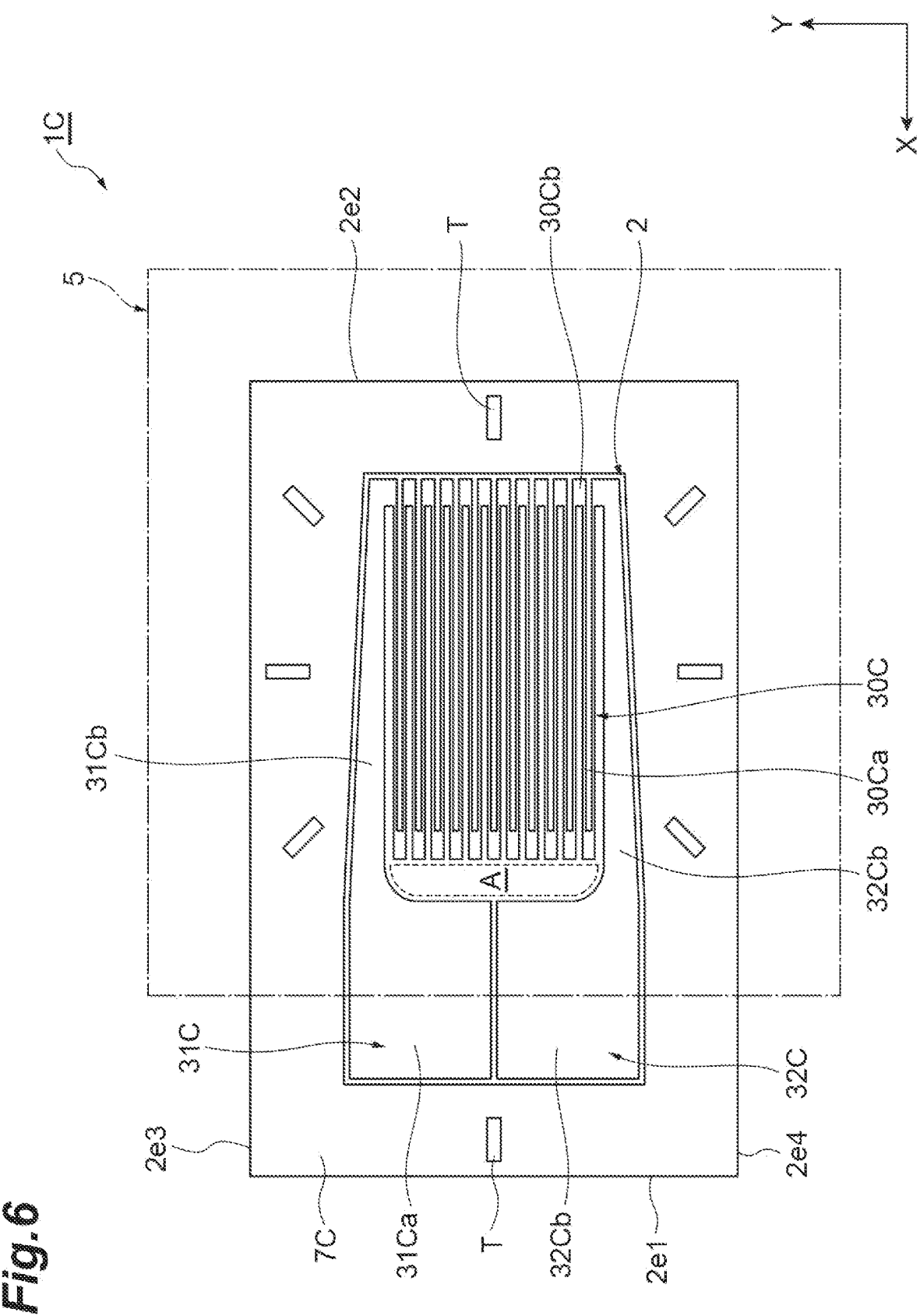
FIG. 6 is a plan view of a strain gauge according to still another embodiment.

In addition, as illustrated in FIG. 6, a covering portion 7C may be disposed to surround the periphery of a resistive body 3C. In a strain gauge 1C, the resistive body 3C includes a sensing portion 30C, a first connection portion 31C, and a second connection portion 32C. The first connection portion 31C includes a connection portion 31Ca, and a coupling portion 31Cb. The second connection portion 32C includes a connection portion 32Ca and a coupling portion 32Cb. A connection site 33C is provided in the first connection portion 31C. A connection site 34C is provided in the second connection portion 32C. The connection portion 31Ca and the connection portion 32Ca are disposed adjacently to each other.

The covering portion 7C is disposed to surround the periphery of the resistive body 3C and is formed continuously. The covering portion 7C extends the outer edges 2e1, 2e2, 2e3, and 2e4 of the substrate 2. In the strain gauge 1C, the marks T are constituted by a portion where the covering portion 7C is not formed (a portion where the main surface 2a of the substrate 2 is exposed). In the strain gauge 1C, since the substrate 2 is covered with the covering portion 7C that is disposed directly on the main surface 2a of the substrate 2, intrusion of moisture into the substrate 2 can be further suppressed.

Figure 7:
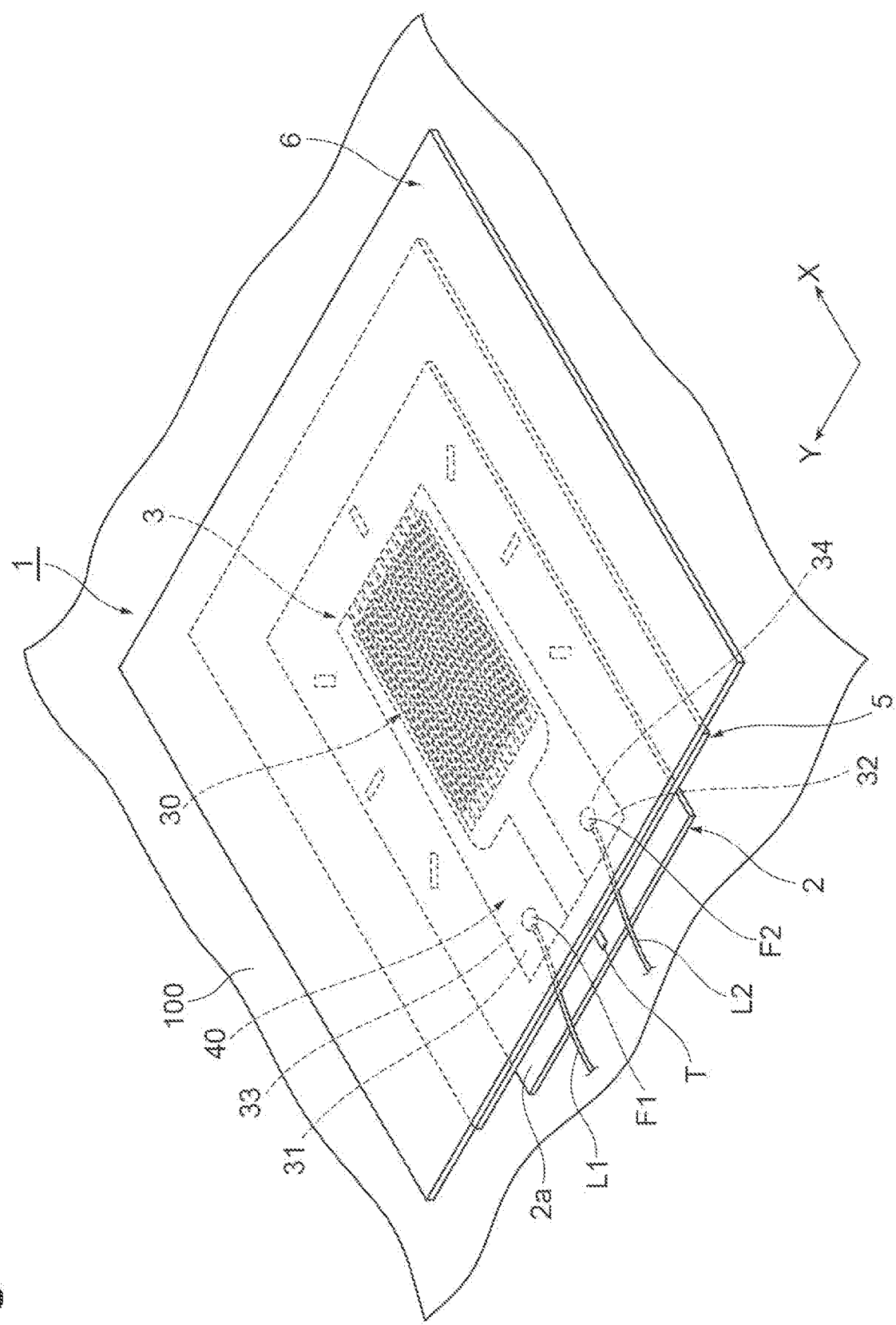
FIG. 7 is a plan view of a strain gauge according to still another embodiment.

In the above-described embodiment, description has been given of an aspect in which the metal sheet 5 is disposed so as not to overlap the first opening 41a and the second opening 42a of the insulating sheet 4, and an end (outer edge 5e1) of the metal sheet 5 on the side of the two connection sites 33 and 34 is located in front of edges of the first opening 41a and the second opening 42a on the sensing portion 30 side when viewed from the sensing portion 30 in the first direction X as an example. However, as illustrated in FIG. 7, in the first connection portion 31 and the second connection portion 32, an insulating layer 40 may be formed on an upper side of the wirings L1 and L2 at the connection sites 33 and 34, and the metal sheet 5 may cover the sensing portion 30, the first connection portion 31, and the second connection portion 32, and may cover at least a part of the wirings L1 and L2 from an upper side of the insulating layer 40 in the first connection portion 31 and the second connection portion 32. In this configuration, the resistive body and a metal sheet are electrically insulated from each other by the insulating layer. In addition, the metal sheet covers the entire region of the sensing portion of the resistive body and the first connection portion and the second connection portion. According to this, in the strain gauge, a region in which the substrate is exposed can be further reduced. Accordingly, in the strain gauge, intrusion of moisture into the substrate can be further suppressed.

In addition, openings corresponding to the two connection sites 33 and 34 may be provided in the metal sheet 5. In this configuration, the metal sheet 5 covers the entire region of the sensing portion of the resistive body, and the first connection portion and the second connection portion. According to this, in the strain gauge, a region in which the substrate is exposed can be further reduced. Accordingly, in the strain gauge, intrusion of moisture into the substrate can be further suppressed.

In the above-described embodiment, description has been given of an aspect in which the insulting portion is the insulating sheet 4 as an example. However, for example, the insulating portion may be formed by applying a resin to the resistive body 3.

What is claimed is:

1. A strain gauge, comprising:
a substrate having insulating properties;
a resistive body disposed on one main surface of the substrate, the resistive body having conductivity and being adapted to stretch and contract in accordance with deformation of the substrate;
a metal sheet that covers the one main surface of the substrate and is formed from a metallic material; and
an insulating sheet that has a shape corresponding to that of the resistive body and that is positioned between the resistive body and the metal sheet, wherein the resistive body includes
a sensing portion formed to extend along a first direction while being folded back,
a first connection portion which is connected to one end of the sensing portion and to which a wiring to an external circuit is connected, and
a second connection portion which is connected to another end of the sensing portion and to which a wiring to the external circuit is connected, and
wherein the sensing portion and the two connection sites are disposed to be spaced apart from each other in the first direction,
the connection site of the first connection portion and the connection site of the second connection portion are provided in parallel in a second direction intersecting the first direction,
the metal sheet covers two outer edges of the one main surface of the substrate in the second direction, and an outer edge on a side opposite to a side where the two connection sites are disposed in the first direction, and
the insulating sheet has a first opening that exposes the first connection portion and a second opening that exposes the second connection portion.

2. The strain gauge according to claim 1, wherein the metal sheet is disposed over the first connection portion, the second connection portion, and the sensing portion, and covers parts of the first connection portion and the second connection portion beyond the portion of the substrate exposed between the two connection sites and the sensing portion when viewed from the sensing portion.

3. The strain gauge according to claim 2,
wherein the metal sheet is disposed so as not to overlap the openings.

4. The strain gauge according to claim 3,
wherein the sensing portion and the two connection sites are disposed to be spaced apart from each other in the first direction,
the connection site of the first connection portion and the connection site of the second connection portion are provided in parallel in a second direction intersecting the first direction, and
an end of the metal sheet on the side of the two connection sites is located in front of edges of the openings on the sensing portion side when viewed from the sensing portion in the first direction.

5. The strain gauge according to claim 1,
wherein, in the first connection portion and the second connection portion, a wire-insulation layer is formed on an upper side of the wiring at each of the connection sites, and
the metal sheet covers the sensing portion, the first connection portion, and the second connection portion, and covers at least a part of the wirings from an upper side of the wire-insulation layer in the first connection portion and the second connection portion.

6. The strain gauge according to claim 1, wherein the metal sheet further protrudes toward an outer side with respect to the two outer edges of the one main surface of the substrate in the second direction, and the outer edge on a side opposite to a side where the two connection sites are disposed in the first direction.

7. The strain gauge according to claim 6, wherein the first direction and the second direction are orthogonal to each other, and
the metal sheet:
protrudes from the substrate by a length equal to or greater than approximately the half of a length between an end of the resistive body and the outer edge of the substrate in the first direction and on a side opposite to the side where the two connection sites are disposed,
protrudes from the substrate by a length equal to or greater than approximately the half of a length between one end of the resistive body and the outer edge of the substrate on the one end side of the resistive body in the second direction, and
protrudes from the substrate by a length equal to or greater than approximately the half of a length between the other end of the resistive body and the outer edge of the substrate on the other end side of the resistive body in the second direction.

8. The strain gauge according to claim 1,
wherein the first direction and the second direction are orthogonal to each other, and
a distance between the sensing portion and the two connection sites is greater than distances between the sensing portion and the two outer edges of the substrate in the second direction, and a distance between the sensing portion and the outer edge of the substrate on a side opposite to the side where the two connection sites are disposed in the first direction.

9. The strain gauge according to claim 1, further comprising:
a rubber sheet covering the metal sheet from an upper side.

10. The strain gauge according to claim 1, further comprising:
a covering portion that is formed from a metallic material, the covering portion disposed to be electrically insulated from the resistive body on the one main surface of the substrate and cover at least a part of the one main surface to suppress intrusion of moisture into the substrate,
wherein the covering portion covers at least a part of the substrate that is not covered with the metal sheet.

11. The strain gauge according to claim 10, wherein the covering portion is disposed at least at a periphery of each of the first connection portion and the second connection portion.

12. The strain gauge according to claim 10, further comprising:
a rubber sheet that covers the metal sheet and the covering portion from an upper side.

13. The strain gauge according to claim 1,
wherein each of the first connection portion and the second connection portion extends to an outer edge of the one main surface of the substrate at least in a region where the metal sheet does not cover the substrate when viewed in a second direction intersecting the first direction.

* * * * *